United States Patent
Cho et al.

(10) Patent No.: US 10,012,886 B2
(45) Date of Patent: Jul. 3, 2018

(54) OPTICAL MODULATORS

(71) Applicant: ELECTRONICS AND TELECOMMUNICATIONS RESEARCH INSTITUTE, Daejeon (KR)

(72) Inventors: Seong-Mok Cho, Daejeon (KR); Tae-Youb Kim, Daejeon (KR); Seung Youl Lee, Daejeon (KR); Yong Hae Kim, Daejeon (KR); Hojun Ryu, Seoul (KR); Juhee Song, Daejeon (KR); Chil Seong Ah, Daejeon (KR); Jeong Ik Lee, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/462,576

(22) Filed: Mar. 17, 2017

(65) Prior Publication Data

US 2018/0011384 A1   Jan. 11, 2018

(30) Foreign Application Priority Data

Jul. 11, 2016   (KR) .................. 10-2016-0087697

(51) Int. Cl.
  *G02F 1/01* (2006.01)
  *G02F 1/15* (2006.01)
  (Continued)

(52) U.S. Cl.
  CPC ...... *G02F 1/1506* (2013.01); *G02F 1/133553* (2013.01); *G02F 1/155* (2013.01); *G02F 1/157* (2013.01); *G02F 1/161* (2013.01)

(58) Field of Classification Search
  CPC .. G02F 2201/52; G02F 1/133514; G02F 1/19; G02F 2001/212; B82Y 20/00
  (Continued)

(56) References Cited

U.S. PATENT DOCUMENTS 4,470,893 A * 9/1984 Oda .................. C25B 1/04
                                                 204/292
6,816,303 B2   11/2004 Ukigaya
(Continued)

FOREIGN PATENT DOCUMENTS

| KR | 10-0511060 B1 | 8/2005 |
| KR | 10-0878769 B1 | 1/2009 |
| KR | 10-2016-0064338 A | 6/2016 |

OTHER PUBLICATIONS

Shingo Araki et al., "Electrochemical Optical-Modulation Device with Reversible Transformation Between Transparent, Mirror, and Black", Advanced Materials, May 10, 2012, pp. OP122-OP126, vol. 24, WILEY-VCH Verlag GmbH & Co. KGaA, Weinheim.

*Primary Examiner* — Mohammed Hasan

(57) ABSTRACT

Disclosed is an optical modulator. An optical modulator comprises a substrate, an upper transparent electrode on the substrate, a partition wall providing a chamber between the substrate and the upper transparent electrode, an optical modulation member provided in the chamber and disposed on the substrate, and an electrolyte filling the chamber and including a first metal in an ionic state. The optical modulation member comprises a reflection layer on the substrate, and a lower transparent electrode on the reflection layer.

15 Claims, 5 Drawing Sheets

(51) Int. Cl.
  *G02F 1/161* (2006.01)
  *G02F 1/155* (2006.01)
  *G02F 1/157* (2006.01)
  *G02F 1/1335* (2006.01)
(58) Field of Classification Search
  USPC .......................................... 359/259–275, 239
  See application file for complete search history.

(56) References Cited

U.S. PATENT DOCUMENTS

| | | | |
|---|---|---|---|
| 7,527,995 B2 * | 5/2009 | Sampsell | B81C 1/00158 |
| | | | 257/E21.009 |
| 7,583,428 B2 | 9/2009 | Moon et al. | |
| 2010/0026727 A1 * | 2/2010 | Bita | G02B 6/0033 |
| | | | 345/690 |
| 2014/0002881 A1 | 1/2014 | Kim | |
| 2015/0185580 A1 | 7/2015 | Cho et al. | |
| 2016/0154288 A1 | 6/2016 | Kim et al. | |

* cited by examiner

OPTICAL MODULATORS

CROSS-REFERENCE TO RELATED APPLICATIONS

This U.S. nonprovisional patent application claims priority under 35 U.S.C § 119 of Korean Patent Application 10-2016-0087697 filed on Jul. 11, 2016 entire contents of which are hereby incorporated by reference.

BACKGROUND

The present inventive concepts relate to an optical modulator and, more particularly, to an optical phase modulator.

In order to display natural 3D images, a holographic 3D image display has recently been studied. Light may be regarded as having wave-like characteristics such as intensity and phase, and holographic technologies are used to display images by controlling the phase and intensity of light. Thus, a holographic 3D image display requires a device to control an amplitude (intensity) or phase of light.

Technologies for modulating amplitude and phase of incident light are being developed to implement a space light modulator (SLM) displaying holographic images. The amplitude modulation technology is to electrically control transmittance or reflectance of light, and the phase modulation technology is to control phase of light transmitted or reflected.

Nowadays, liquid crystals are principally used for the space light modulator using the phase modulation technology. A viewing angle is considered as an important factor determining performance characteristics of the holographic image display. As the viewing angle improves with decreasing pixel pitch of the space light modulator, the holographic image display is increasingly required to have a fine pixel pitch. However, when the space light modulator using the liquid crystals has a small pixel pitch, a fine pitch device may be hardly achieved due to pixel interference inevitably caused by a spreading phenomenon of an applied electric field.

SUMMARY

Example embodiments of the present inventive concepts provide an optical modulator having a high reflectance.

Example embodiments of the present inventive concepts provide an optical modulator capable of obtaining a large phase difference.

Example embodiments of the present inventive concepts relate to an optical modulator that can be fabricated to have a fine pixel structure.

An object of the present inventive concepts is not limited to the above-mentioned one, other objects which have not been mentioned above will be clearly understood to those skilled in the art from the following description.

According to exemplary embodiments of the present inventive concepts, an optical modulator may comprise a substrate, an upper transparent electrode on the substrate, a partition wall providing a chamber between the substrate and the upper transparent electrode, an optical modulation member provided in the chamber and disposed on the substrate, and an electrolyte filling the chamber and including a first metal in an ionic state. The optical modulation member may comprise a reflection layer on the substrate, and a lower transparent electrode on the reflection layer.

In some exemplary embodiments, when the lower transparent electrode may be applied with a negative voltage, a metal layer may be electro-deposited on a surface of the lower transparent electrode. The metal layer may include the first metal.

In some exemplary embodiments, the first metal may comprise silver (Ag), bismuth (Bi), aluminum (Al), or copper (Cu).

In some exemplary embodiments, the reflection layer may comprise aluminum (Al) or silver (Ag).

In some exemplary embodiments, the lower transparent electrode may have a thickness ranging from about 10 nm to about 300 nm.

In some exemplary embodiments, the optical modulator may further comprise an ion storage layer on the upper transparent electrode and in contact with the electrolyte.

In some exemplary embodiments, the ion storage layer may comprise titanium oxide (TiO2), antimony-doped tin oxide (Sb-doped SnO2), cerium oxide-titanium oxide (CeO2-TiO2), or cerium oxide-silicon oxide (CeO2-SiO2).

In some exemplary embodiments, the optical modulator may further comprise a first insulation layer between the substrate and the optical modulation member.

In some exemplary embodiments, the optical modulation member may be provided in plural in the chamber.

In some exemplary embodiments, the optical modulator may further comprise a second insulation layer in the chamber and covering a side surface and a portion of a top surface of the optical modulation member.

In some exemplary embodiments, the optical modulator may further comprise a driving member between the substrate and the optical modulation member. The driving member may comprise a thin film transistor.

DETAILED DESCRIPTION OF EMBODIMENTS

Figure 1:
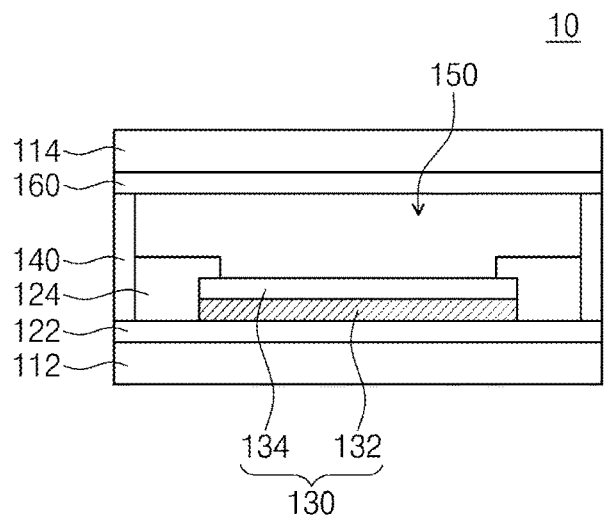
FIGS. 1 and 2 are cross-sectional views for explaining an optical modulator according to exemplary embodiments of the present inventive concepts.

In order to sufficiently understand the configuration and effect of the present invention, embodiments of the present invention will be described with reference to the accompanying drawings. However, the present invention is not limited to the embodiments set forth herein, it may be implemented in various forms and can be subjected to various modifications. Rather, the embodiments are provided only to disclose the present invention and let those skilled in the art fully know the scope of the present invention. One of ordinary skill in the art will understand that the present inventive concept may be carried out in any suitable environment.

As used herein, the terms are intended to illustrate the embodiments and are not intended to limit the present invention. As used herein, the singular forms are intended to include the plural forms as well, unless the context clearly indicates otherwise. It will be understood that the terms "comprises", and/or "comprising" specify the presence of stated elements, steps, operations, and/or devices, but do not preclude the presence or addition of one or more other elements, steps, operations, and/or devices.

It will be understood that when a layer or section is referred to as being disposed on a substrate, it can be directly disposed on the substrate or other layer or section, or intervening elements may be present.

It will be understood that, although the terms "first", "second", "third", etc. may be used herein to describe various elements, these elements should not be limited by these terms. These terms are only used to distinguish one region, layer, or section from another region, layer, or section. Thus, a first layer discussed below could be termed a second layer without departing from the teaching of the embodiments. The exemplary embodiments explained and illustrated herein include complementary embodiments thereof. Like reference numerals refer to like elements throughout the specification.

Unless otherwise defined, all terms used herein have the same meaning as commonly understood by one of ordinary skill in the art to which exemplary embodiments of the present invention belong.

It will be hereinafter described about an optical modulator according to the present inventive concepts with reference to the accompanying drawings.

Figure 2:
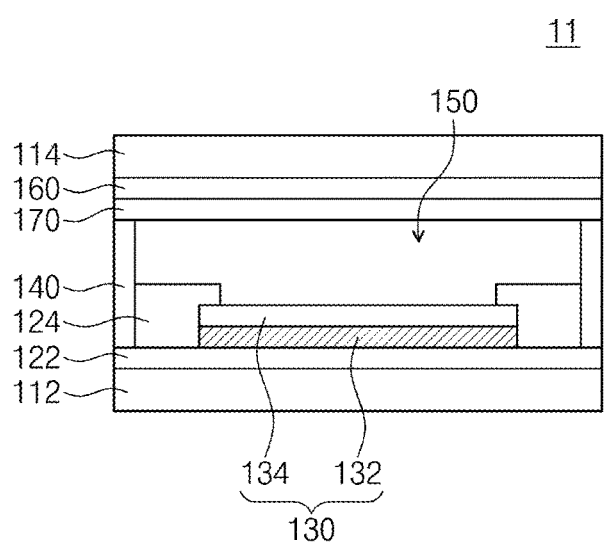

FIGS. 1 and 2 are cross-sectional views for explaining an optical modulator according to exemplary embodiments of the present inventive concepts.

Referring to FIG. 1, an optical modulator 10 may include a lower substrate 112. The lower substrate 112 may include a glass substrate or a silicon substrate.

A first insulation layer 122 may be disposed on the lower substrate 112. The first insulation layer 122 may be provided to insulate the lower substrate 112 from a lower transparent electrode 134 and a reflection layer 132 that are discussed below. For example, the first insulation layer 122 may include oxide or nitride. In other embodiments, the first insulation layer 122 may be omitted if necessary. For example, if the lower substrate 112 includes an insulating material, the first insulation layer 122 may not be provided.

An upper transparent electrode 160 may be disposed on the first insulation layer 122. The upper transparent electrode 160 may be transparent in the visible light range. The upper transparent electrode 160 may include ITO (Indium Tin Oxide) or FTO (Fluorine-doped Tin Oxide).

An upper substrate 114 may be disposed on the upper transparent electrode 160. The upper substrate 114 may be a transparent substrate. For example, the upper substrate 114 may include a glass substrate.

A partition wall 140 may be disposed between the upper transparent electrode 160 and the first insulation layer 122. The partition wall 140 may provide a chamber 150 between the upper transparent electrode 160 and the first insulation layer 122. In detail, the partition wall 140 may separate the upper transparent electrode 160 from the first insulation layer 122, and may hermetically seal between the upper transparent electrode 160 and the first insulation layer 122.

The chamber 150 may be filled with an electrolyte. The electrolyte may include a supporting electrolyte and a first metal. The supporting electrolyte may include a lithium (Li) based electrolyte or a polar solvent based electrolyte. For example, the polar solvent may include water, propylene carbonate, or dimethyl sulfoxide (DMSO). The supporting electrolyte may include lithium (Li) ion, copper (Cu) ion, or bromine (Br) ion. The first metal may include silver (Ag), bismuth (Bi), aluminum (Al), or copper (Cu). The first metal may be present in an ionic state in the supporting electrolyte. In certain embodiments, the electrolyte may further include an additive. The additive may be provided to adjust viscosity of the electrolyte. For example, the additive may include polyvinyl alcohol (PVA) or poly(ethylene oxide) (PEO).

An optical modulation member 130 may be disposed in the chamber 150. The optical modulation member 130 may be disposed on a top surface of the first insulation layer 122. The optical modulation member 130 may modulate and reflect light incident through the upper substrate 114 and the upper transparent electrode 160. This will be further described below in detail with reference to FIGS. 3A and 3B. The optical modulation member 130 may include a reflection layer 132 and a lower transparent electrode 134.

The reflection layer 132 may be disposed on the first insulation layer 122. The reflection layer 132 may include a metal having high reflectance. For example, the reflection layer 132 may include silver (Ag) or aluminum (Al). The reflection layer 132 may function as a mirror. For example, the reflection layer 132 may reflect light incident through the upper substrate 114 and the upper transparent electrode 160.

The lower transparent electrode 134 may be disposed on the reflection layer 132. The lower transparent electrode 134 may have a thickness ranging from about 10 nm to about 300 nm. The lower transparent electrode 134 may be transparent in the visible light range. The lower transparent electrode 134 may include ITO or FTO.

A second insulation layer 124 may be disposed on the first insulation layer 122. In detail, the second insulation layer 124 may cover a side surface and a portion of a top surface of the optical modulation member 130. In this configuration, the second insulation 124 may partially expose a top surface of the lower transparent electrode 134. The second insulation layer 124 may permit the lower transparent electrode 134 to have thereon a region on which a metal layer (see 136 of FIG. 3A) is electro-deposited when the optical modulator 10 is in an operating process, which will be discussed below. In certain embodiments, the second insulation layer 124 may be omitted if necessary.

In other embodiments, as shown in FIG. 2, an optical modulator 11 may be provided to further include an ion storage layer 170. The ion storage layer 170 may be disposed on a bottom surface of the upper transparent electrode 160. The ion storage layer 170 may thus be in contact with the electrolyte in the chamber 150. The ion storage layer 170 may be transparent in the visible light range. Even if the ion storage layer 170 is oxidized or reduced, transparency of the ion storage layer 170 may be consistently preserved in the visible light range. For example, the ion storage layer 170 may include titanium oxide (TiO2), antimony-doped tin oxide (Sb-doped SnO2), cerium oxide-titanium oxide (CeO2-TiO2), or cerium oxide-silicon oxide (CeO2-SiO2). The ion storage layer 170 may be provided to enhance bi-stability when the optical modulator 11 is operated. This will be further described below in detail concurrently with explanation of the operation of the optical modulator 11.

Figure 3A:
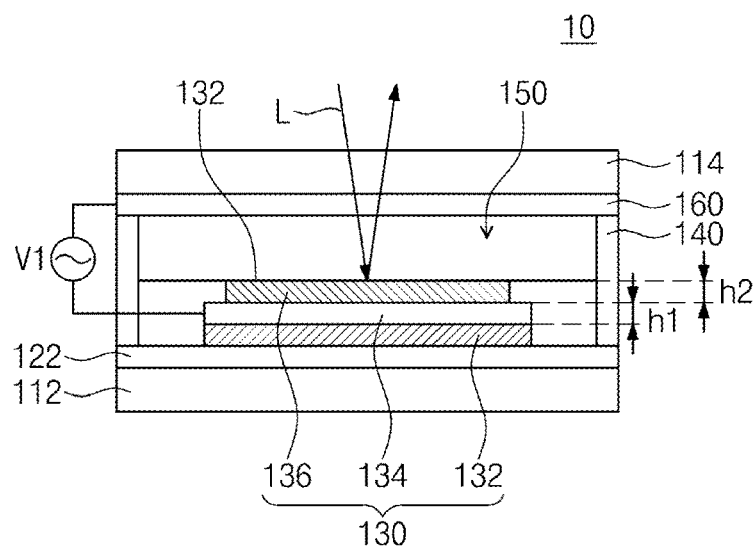
FIGS. 3A and 3B are cross-sectional views for explaining an operation of an optical modulator according to exemplary embodiments of the present inventive concepts.
Figure 3B:
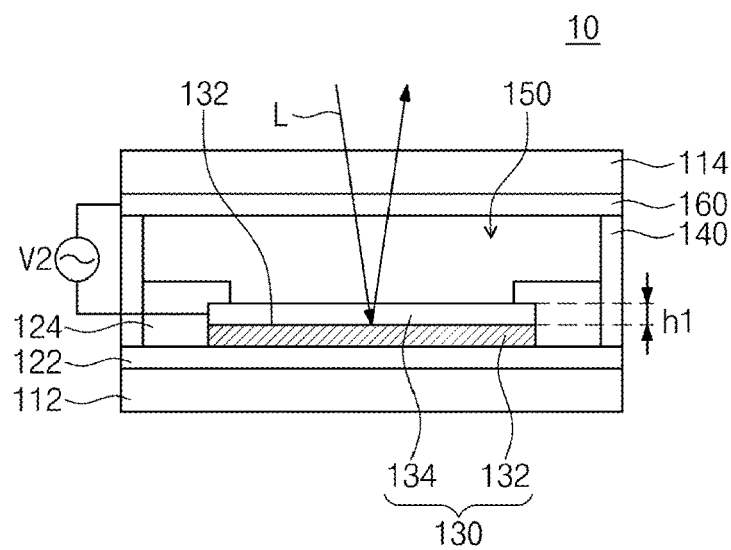

It will be hereinafter described about an operation of the optical modulator 10 according to exemplary embodiments of the present inventive concepts. FIGS. 3A and 3B are cross-sectional views for explaining the operation of an optical modulator according to exemplary embodiments of the present inventive concept.

Referring to FIG. 3A, a power V1 may be supplied between the lower transparent electrode 134 and the upper transparent electrode 160. For example, the lower transparent electrode 134 may correspond to a cathode, and the upper transparent electrode 160 may correspond to an anode.

The lower transparent electrode 134 may have a potential lower than that of the upper transparent electrode 160. The lower transparent electrode 134 as the cathode may donate electrons to the electrolyte. An ion of the first metal in the electrolyte may accept the electron from the lower transparent electrode 134, and thus be electro-deposited on the lower transparent electrode 134. The electro-deposition of the first metal may form a metal layer 136 on the lower transparent electrode 134. The metal layer 136 may reflect light incident through the upper substrate 114 and the upper transparent electrode 160. In this case, the optical modulator 10 may operate in a first mode where light L is reflected from the metal layer 136.

Referring to FIG. 3B, a power V2 reverse to the V1 may be supplied between the lower transparent electrode 134 and the upper transparent electrode 160. For example, the lower transparent electrode 134 may correspond to an anode, and the upper transparent electrode 160 may correspond to a cathode. The lower transparent electrode 134 may have a potential higher than that of the upper transparent electrode 160. The lower transparent electrode 134 as the anode may accept electrons from the metal layer 136. The metal layer 136 may donate electrons to the lower transparent electrode 134 and then be ionized to become ions of the first metal. The first metal ions may be dissolved into the electrolyte. As such, the metal layer 136 may be removed from the top surface of the lower transparent electrode 134. In this case, the optical modulator 10 may operate in a second mode where light L is reflected from the reflection layer 132.

Referring together to FIGS. 3A and 3B, the first and second modes may give different paths to the light L reflected from the optical modulator 10. In detail, in the first mode, the light L may be reflected from a top surface 136s of the metal layer 136. In the second mode, the light L may be reflected from a top surface 132s of the reflection layer 132. The top surface 136s of the metal layer 136 may be positioned higher than the top surface 132s of the reflection layer 132, and the height difference between the surfaces 136s and 132s may correspond to a sum of a thickness h1 of the lower transparent electrode 134 and a thickness h2 of the metal layer 136. The lights L reflected in the first and second modes may have a path difference given below in terms of the thicknesses h1 of the lower transparent electrode 134 and the thickness h2 of the metal layer 136.

$$\Delta x = 2 \cdot (h1 \cdot n1 + h2 \cdot n2)$$

where, $\Delta x$ means a path difference between the lights L reflected in the first and second modes, h1 denotes a thickness of the lower transparent electrode 134, n1 indicates a refractive index of the lower transparent electrode 134, h2 expresses a thickness of the metal layer 136, and n2 signifies a refractive index of the metal layer 136.

The lights L reflected in the first and second modes may have a path difference, and may have different phases at the same position. In other words, a phase difference may be given to the lights L reflected in the first and second modes. The following equation may be used to calculate a phase difference between the lights L reflected in the first and second modes.

$$\Delta \Phi = 2\pi \cdot \Delta x / \lambda$$

where, $\Delta \Phi$ means a phase difference between the lights L reflected in the first and second modes, $\Delta x$ means a path difference between the lights L reflected in the first and second modes, and $\lambda$ indicates a wavelength of the light L.

The path of the light L reflected in the first mode may vary depending on the thicknesses h1 of the lower transparent electrode 134 and the thickness h2 of the metal layer 136. The phase difference between the lights L in the first and second modes may thus be adjusted by the thicknesses h1 of the lower transparent electrode 134 and the thickness h2 of the metal layer 136.

The optical modulator 10 according to the present inventive concepts may use an electro-deposition to change a layer from which the light L is reflected. Thus, the reflected light L may have a path difference, with the result that a large phase difference may be given to reflected light that is modulated by the optical modulator 10.

In certain embodiments, the optical modulator 11 including the ion storage layer 170 may have enhanced bi-stability.

In detail, a reduction reaction may occur in the first mode such that the first metal included in the electrolyte may be electro-deposited on the lower transparent electrode 134. When the first metal is reduced to form the metal layer 136 on the lower transparent electrode 134, counter ions may be formed on the upper transparent electrode 160.

In the case of the optical modulator 11 including the ion storage layer 170 as shown in FIG. 2, in the first mode, a reduction reaction and an oxidation reaction may occur on the lower transparent electrode 134 and the upper transparent electrode 160, respectively. In this step, instead that counter ions (e.g., copper ion (Cu2+) are formed on the upper transparent electrode 160, the ion storage layer 170 may be oxidized on the upper transparent electrode 160 as the cathode. Owing to the oxidation of the ion storage layer 170 fixed on the upper transparent electrode 160, a stable charge balance may be achieved in the electrolyte. In some embodiments, although the power V1 is removed after the metal layer 136 is formed on the lower transparent electrode 134, the first metal constituting the metal layer 136 may not dissolve in the electrolyte because of absence of ion diffusion toward the lower transparent electrode 134 from the electrolyte. The optical modulator 11 may eventually have enhanced bi-stability where the metal layer 136 may still remain even in the electrical open state. In addition, the optical modulators 10 and 11 according to the present inventive concepts may have a high reflectance regardless of phase shift.

Figure 4:
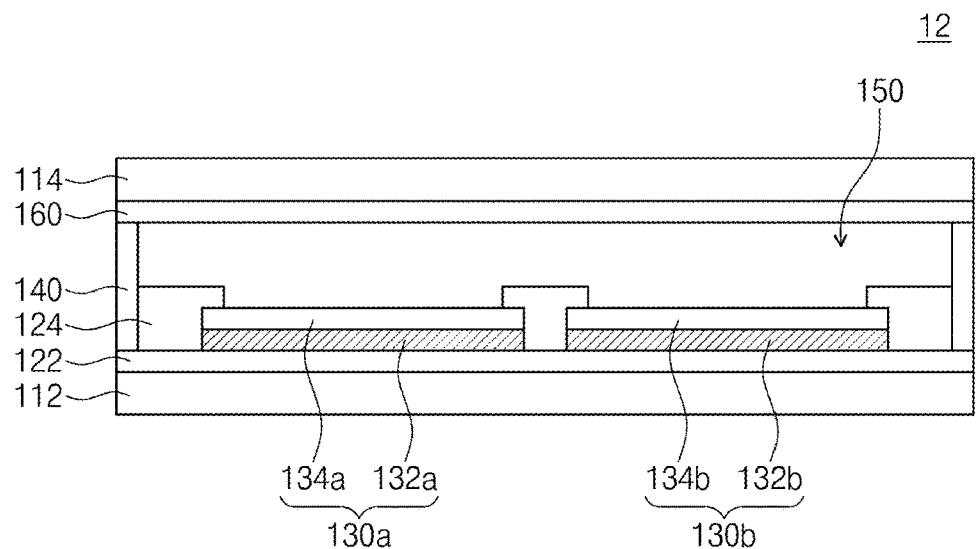
FIGS. 4 and 5 are cross-sectional views for explaining an optical modulator according to exemplary embodiments of the present inventive concepts.
Figure 5:
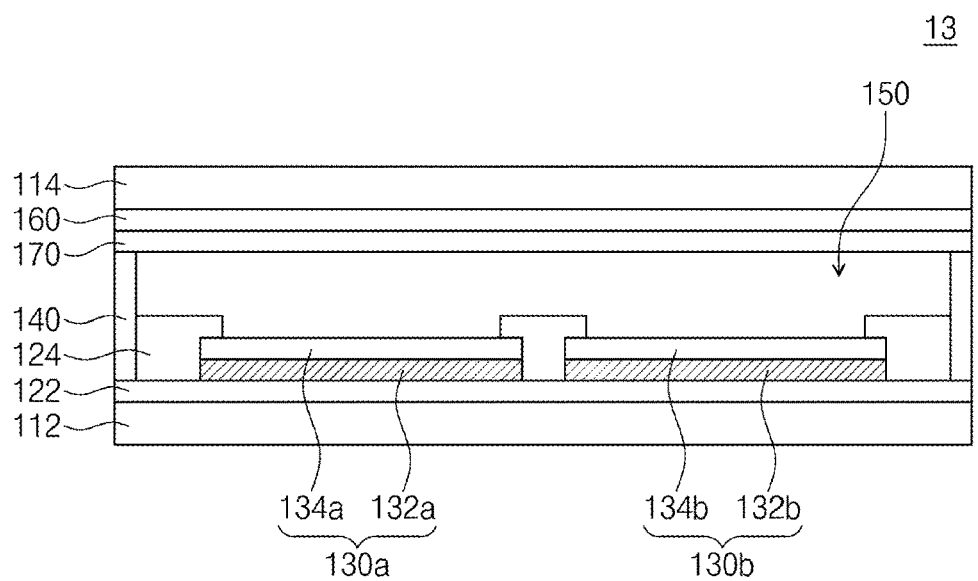

FIGS. 4 and 5 are cross-sectional views for explaining an optical modulator according to exemplary embodiments of the present inventive concepts. For convenience of the description, a repetitive explanation will be omitted.

Referring to FIG. 4, an optical modulator 12 according to exemplary embodiments of the present inventive concepts may include a plurality of optical modulation members 130a and 130b. In detail, the optical modulation members 130a and 130b may include a first optical modulation member 130a and a second optical modulation member 130b that are provided in the chamber 150. The first and second optical modulation members 130a and 130b may be disposed spaced apart from each other on a top surface of the first insulation layer 122. The first and second optical modulation members 130a and 130b may be pixels of the optical modulator 12. Although the optical modulator 12 is illustrated to include two optical modulation members 130a and 130b therein, the present inventive concepts are not limited thereto. The optical modulator 12 may include more than two optical modulation members in the chamber 150.

The first optical modulation member 130a may include a first reflection layer 132a and a first lower transparent electrode 134a. The first reflection layer 132a may be disposed on the first insulation layer 122, and the first lower transparent electrode 134a may be disposed on the first reflection layer 132a. The first lower transparent electrode 134a may serve as a mirror, together with the first reflection layer 132a. For example, the first reflection layer 132a may reflect light incident through the upper substrate 114 and the upper transparent electrode 160.

The second optical modulation member 130b may include a second reflection layer 132b and a second lower transparent electrode 134b. The second reflection layer 132b may be disposed on the first insulation layer 122, and the second lower transparent electrode 134b may be disposed on the second reflection layer 132b. The second lower transparent electrode 134b may serve as a mirror, together with the second reflection layer 132b. For example, the second reflection layer 132b may reflect light incident through the upper substrate 114 and the upper transparent electrode 160.

The upper transparent electrode 160 may be a common electrode for the first and second lower transparent electrodes 134a and 134b. For example, the upper transparent electrode 160 may be applied with a reference voltage. The first lower transparent electrode 134a may be applied with a voltage for driving the first optical modulation member 130a, and the second lower transparent electrode 134b may be applied with a voltage for driving the second optical modulation member 130b. In other words, the optical modulation members 130a and 130b may be independently driven by an active matrix mode. The first and second optical modulation members 130a and 130b may be driven independently of each other, and may be driven without mutual interference (e.g., electric field) therebetween. It thus may be possible to reduce a pitch between the first and second optical modulation members 130a and 130b, and to allow the optical modulator 12 to have fine pixels.

In other embodiments, as shown in FIG. 5, an optical modulator 13 may be provided to further include an ion storage layer 170. The ion storage layer 170 may be disposed on a bottom surface of the upper transparent electrode 160. The ion storage layer 170 may be provided to enhance bi-stability when an optical modulator 13 is operated.

Hereinafter, it will be described in detail about optical characteristics of an optical modulator with reference to experimental examples according to the present inventive concepts.

Formation of Optical Modulator

EXPERIMENTAL EXAMPLE 1

According to the embodiments of the present inventive concepts, an optical modulator was fabricated to include a single optical modulation member 130. Aluminum (Al) was used to form the reflection layer 132 having a thickness of about 100 nm, and ITO was used to form the lower transparent electrode 134 having a thickness of about 80 nm. Dimethyl sulfoxide (DMSO) including silver (Ag) ions was used as the electrolyte.

EXPERIMENTAL EXAMPLE 2

An optical modulator was fabricated to have the same structural configuration as the Experimental Example 1. Exceptionally, the lower transparent electrode 134 of ITO was formed to have a thickness of about 60 nm.

Analysis of Optical Modulation Characteristics

After fabricating the optical modulators in accordance with the experimental examples, simulation measurement was performed to determine a phase difference between lights reflected in the first and second modes. Simulation measurement was also carried out to obtain reflectance of the optical modulator in the first and second modes. The current simulation experiment was established such that a voltage was applied to electro-deposit the metal layer 136 about 30 nm thick in the first mode.

Figure 6A:
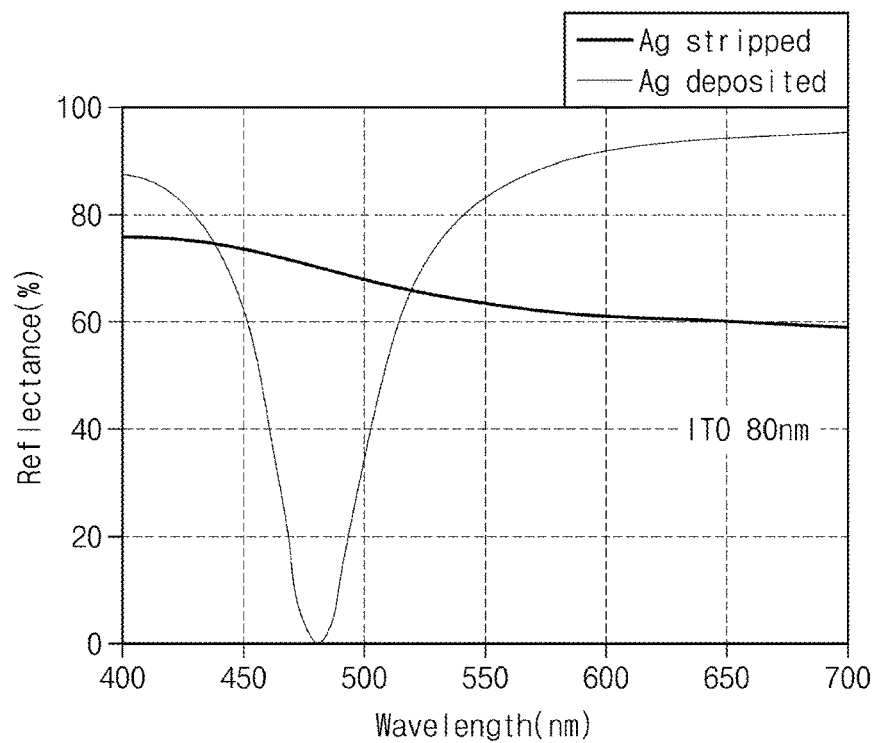
FIGS. 6A and 6B are graphs illustrating simulation results of experimental example 1.
Figure 6B:
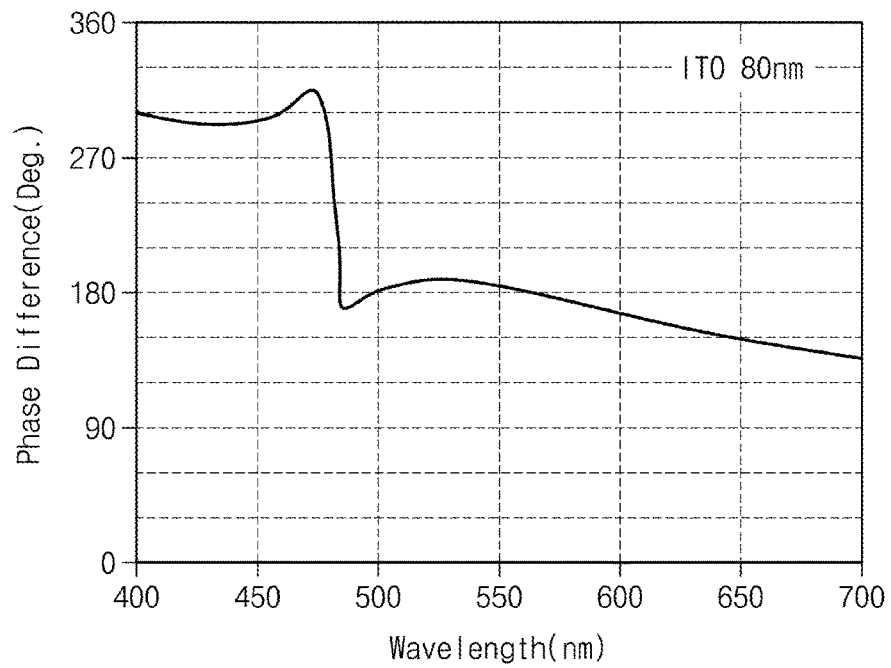
Figure 7A:
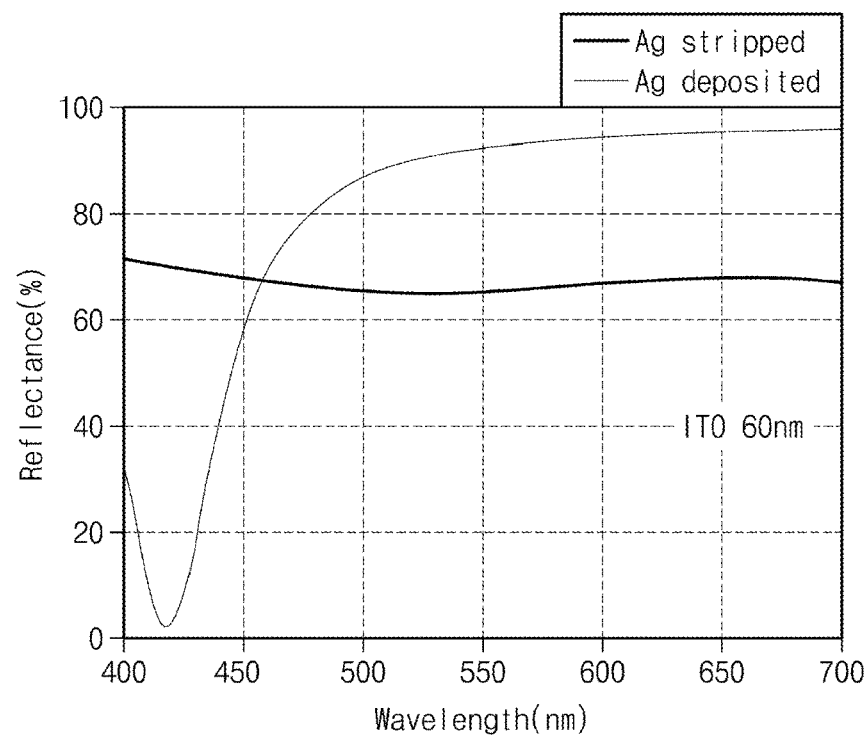
FIGS. 7A and 7B are graphs illustrating simulation results of experimental example 2.
Figure 7B:
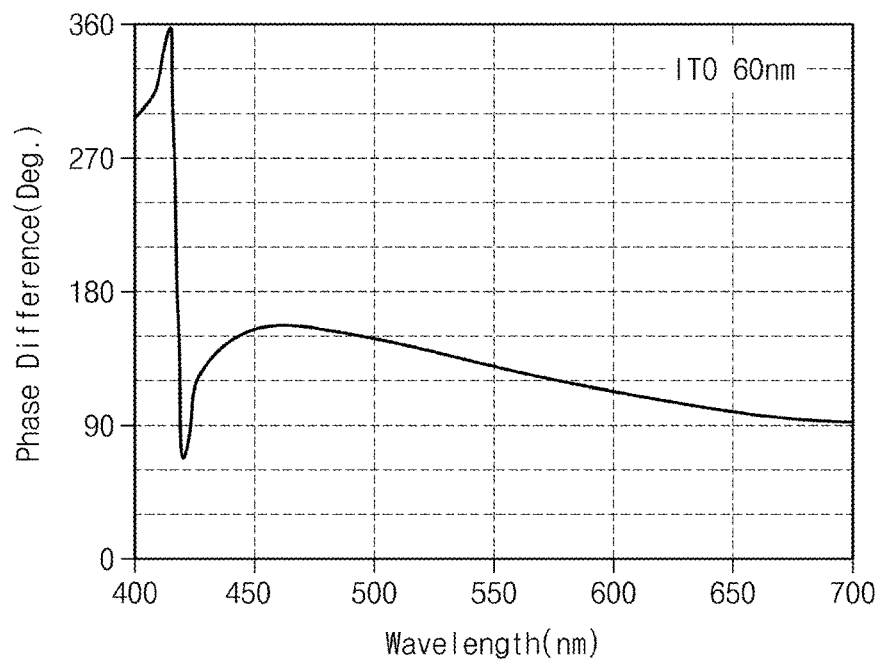

FIGS. 6A and 6B are graphs illustrating simulation results of experimental example 1. FIGS. 7A and 7B are graphs illustrating simulation results of experimental example 2. FIGS. 6A and 7A are graphs showing reflectance versus wavelength of incident light, and FIGS. 6B and 7B are graphs showing phase difference versus wavelength of incident light.

Referring to FIG. 6A, the experimental example 1 exhibited a reflectance of about 60% or more in the second mode (i.e., Ag stripped), and also exhibited a reflectance of about 80% or more in the first mode (i.e., Ag deposited) except some wavelength range. Some wavelength band may exhibit zero reflectance, which is due to plasma resonance, and the thickness of the lower transparent electrode may be adjusted to change the wavelength band exhibiting the zero reflectance. In other words, a high reflectance may be obtained when the lower transparent electrode is adjusted to its thickness in accordance with a wavelength band intended to use. Referring to FIG. 6B, the experimental example 1 exhibited a phase difference, whose value is about 120° or more at a wavelength band ranging from about 500 nm to about 700 nm, between lights reflected in the first mode (Ag deposited) and the second mode (Ag stripped). These results may demonstrate that the optical modulator according to the present inventive concepts modulates the reflected light to obtain a large phase difference.

Referring to FIG. 7A, the experimental example 2 exhibited a reflectance of about 60% or more in the second mode (i.e., Ag stripped), and also exhibited a reflectance of about 80% or more in the first mode (i.e., Ag deposited) except some wavelength band. In comparison with the experimental example 1, it may be ascertained that the wavelength band exhibiting zero reflectance is changed depending on the thickness of the lower transparent electrode. Referring to FIG. 7B, the experimental example 2 exhibited a phase difference, whose value is about 90° or more at a wavelength band ranging from about 430 nm to about 700 nm, between lights reflected in the first mode (i.e., Ag deposited) and the second mode (i.e., Ag stripped). These results may also demonstrate that the optical modulator according to the present inventive concepts modulates the reflected light to obtain a large phase difference.

The optical modulator according to the present inventive concepts may use a reversible electro-deposition to change a layer from which light is reflected. The reflected light may then have a path difference, with the result that a large phase difference may be given to the reflected light that is modulated by the optical modulator. Moreover, the optical modulator according to the present inventive concepts may have a high reflectance regardless of phase shift.

The optical modulation members of the optical modulator according to the present inventive concepts may be driven independently of each other, and may be driven without mutual interference. It thus may be possible to reduce a pitch between the optical modulation members, and to allow the optical modulator to have fine pixels.

Although the present invention has been described in connection with the embodiments of the present inventive concepts illustrated in the accompanying drawings, it will be understood by one of ordinary skill in the art that variations in form and detail may be made therein without departing from the spirit and essential feature of the present inventive concepts. The above disclosed embodiments should thus be considered illustrative and not restrictive.

What is claimed is:

1. An optical modulator, comprising:
a substrate;
an upper transparent electrode disposed over the substrate;
a partition wall providing a chamber between the substrate and the upper transparent electrode;
an optical modulation member disposed in the chamber between the substrate and the upper transparent electrode, the optical modulation member including a reflection layer and a lower transparent electrode, the reflection layer being disposed between the lower transparent electrode and the substrate; and
an electrolyte disposed in the chamber between the upper transparent electrode and the optical modulation member, the electrolyte including a first metal in an ionic state,
wherein
the optical modulation member further includes a metal layer when a first voltage is applied between the upper transparent electrode and the lower transparent electrode, the metal layer being disposed between the upper transparent electrode and the lower transparent electrode, and
wherein the metal layer is dissolved in the electrolyte when a second voltage is applied between the upper transparent electrode and the lower transparent electrode, the second voltage being different from the first voltage.

2. The optical modulator of claim 1, wherein the metal layer is electro-deposited on an upper surface of the lower transparent electrode when a negative voltage is applied to the lower transparent electrode.

3. The optical modulator of claim 1, wherein the first metal comprises silver (Ag), bismuth (Bi), aluminum (Al), or copper (Cu).

4. The optical modulator of claim 1, wherein the reflection layer comprises aluminum (Al) or silver (Ag).

5. The optical modulator of claim 1, wherein the lower transparent electrode has a thickness ranging from about 10 nm to about 300 nm.

6. The optical modulator of claim 1, further comprising an ion storage layer on the upper transparent electrode and in contact with the electrolyte.

7. The optical modulator of claim 6, wherein the ion storage layer comprises titanium oxide ($TiO_2$), antimony-doped tin oxide (Sb-doped $SnO_2$), cerium oxide-titanium oxide ($CeO_2$—$TiO_2$), or cerium oxide-silicon oxide ($CeO_2$—$SiO_2$).

8. The optical modulator of claim 1, further comprising a first insulation layer between the substrate and the optical modulation member.

9. The optical modulator of claim 1, wherein the optical modulation member is a first optical modulation member, the optical modulator further comprising:
one or more second optical modulation members disposed in the chamber.

10. The optical modulator of claim 1, wherein when the first voltage is applied between the upper transparent electrode and the lower transparent electrode, the lower transparent electrode corresponds to a cathode and the upper transparent electrode corresponds to an anode, and
wherein when the second voltage is applied between the upper transparent electrode and the lower transparent electrode, the lower transparent electrode corresponds to an anode and the upper transparent electrode corresponds to a cathode.

11. The optical modulator of claim 1, wherein the first and second voltages have opposite polarities.

12. The optical modulator of claim 1, wherein the metal layer is reflective,
wherein light incident through the upper transparent electrode is reflected by the reflection layer when the metal layer is dissolved, and
wherein light incident through the upper transparent electrode is reflected by the metal layer when the optical modulation member includes the metal layer.

13. An optical modulator, comprising:
an upper transparent electrode;
a reflection layer;
a lower transparent electrode disposed between the upper transparent electrode and the reflection layer;
an electrolyte disposed between the upper transparent electrode and the lower transparent electrode,
wherein a metal layer is disposed on an upper surface of the lower transparent electrode or is dissolved in the electrolyte according to a voltage applied between the upper transparent electrode and the lower transparent electrode.

14. The optical modulator of claim 13, wherein the metal layer is disposed on the upper surface of the lower transparent electrode when the voltage has a first polarity, and
wherein the metal layer is dissolved when the voltage has a second polarity, the first and second polarities being opposite polarities.

15. The optical modulator of claim 13, wherein the metal layer is reflective, and
wherein light incident through the upper transparent electrode is reflected by the reflection layer when the metal layer is dissolved, and
wherein light incident through the upper transparent electrode is reflected by the metal layer when the optical modulation member includes the metal layer.

* * * * *